Patented Oct. 24, 1933

1,931,958

UNITED STATES PATENT OFFICE 1,931,958

MOLDING MIXTURE AND MOLDED ARTICLE

Frazier Groff, Bloomfield, N. J., assignor to Bakelite Corporation, New York, N. Y., a corporation of Delaware No Drawing. Application August 10, 1926
Serial No. 128,513

6 Claims. (Cl. 106—15)

This invention relates primarily to molding mixtures of the type having a reactive phenolic resin binder, and comprises a novel mixture including a highly reactive resin of this kind, a component serving to modify and control the reactivity of the resin, and a suitable filler.

It is known that clear resins characterized by their amber color and by the presence therein of ammonia may be prepared by reacting upon hexamethylenetetramine with phenol or cresol, as described in United States Patent 1,187,230, to L. H. Baekeland. Such resins have been largely employed in the manufacture of transparent or in some cases of clouded or filled products, but are not well suited as such for the preparation of molding compounds.

The initial fusible resins are characterized by a very high degree of reactivity; in other words, they are rapidly transformed under the action of heat into the infusible resinoids. Hence it is found that if molding mixtures containing them are subjected to the usual mixing and sheeting operation under heated rolls the transformation of the resin toward the resinoid or infusible modification will be so far advanced as to render the resulting mixture deficient in plasticity and molding quality.

I have discovered that by the use of appropriate organic bodies which I term retardants, this excessive reactivity may be diminished and controlled at will, so that resins of this type may be made available for use in the compounding of mixtures of excellent molding quality.

I have further discovered that if the retardant chosen is also characterized by a water-repellant character, and by a low vapor pressure, in addition to the essential capability of forming solid solutions with the phenolic resin, and is properly incorporated, and if fillers of proper characteristics are added, these molding mixtures yield, by the standard hot-press molding operation, molded articles characterized by very low phase angle difference and power factor. This is the more unexpected since the molded articles contain substantial proportions of nitrogen, presumably bound in the form of ammonia or ammonia derivatives; and it has heretofore been commonly considered that molded products high in nitrogen were apt to be deficient in insulating quality. It appears however from my investigations that this is not the case provided the molded product is substantially dehydrated and substantially impervious to moisture, so that the initial presence or subsequent formation of ammonium hydroxid is precluded. Where a very low power factor is desired it is essential that the retardant and the filler be properly chosen to cooperate in producing this result.

A very good retardant is rosin, preferably of a pure grade, for example so-called water-white rosin. Xylidene, toluidine, benzidine, and diphenyl-amine are also excellent for the purpose, especially where low power factor is desired. Other resins combining molding quality, insulating value and a water-repellant character may replace rosin wholly or in part, as for example dammar, hard manila and the like. Di-butyl or di-ethyl phthalates, tartrates, etc. may be used where the power factor requirements are not too severe.

Various fillers may be used, according to specific requirements for the molded articles. Fibrous fillers, as wood flour and the like impart strength and shock-resistance. Where a very low power-factor is desired powdered mica may be used, or other inorganic fillers such as infusorial earth (kieselguhr), ground oil shale, or slate dust, alone or mixed with animal hair or other fiber.

Very low power factor compounds can also be produced when the resin as described above is heated to the infusible insoluble resinoid state, powdered and used as a filler in the same way that mica or ground shale are used. For example, 50 pounds of insoluble infusible powdered resin mixed with 50 pounds of a potentially reactive resin of the above type, properly ground and mixed on rolls, will make a molding mixture of very low power factor. Any part of the above finished infusible powdered resin may be replaced by an equal volume of mica, ground oil-shale, etc.

Following is a typical example illustrative of the invention, it being understood that the invention is not limited to the particular materials, proportions or manipulations set forth:

Phenol and hexamethylenetetramine or their equivalents are reacted in approximate proportions of 3 mols of phenol to 1 mol of hexamethylenetetramine. It is not essential that these exact proportions be followed, but it is essential that the relative amounts of hexamethylenetetramine and phenol be such so as to prevent the end product from containing amounts of uncombined phenol which would too greatly decrease the desired useful electrical properties. If the proportion of phenol be notably increased, say for instance to 4 mols, so that notable amounts of uncombined phenols persist in the final product, the power factor is adversely affected. As a specific illustration, 282 parts by weight of phenol and 140 parts of hexamethylenetetramine are reacted cautiously until the viscosity of the resulting resin has increased markedly, when 70 parts of melted rosin are added and stirred in. The reaction is continued with stirring until the mass stiffens, when it is poured. Thereafter the reaction is further advanced, and proper molding consistency attained, by baking the material in an oven at 100°–125° C.; or alternatively, by kneading it under heated rolls.

As already stated, the rosin may be replaced by other diluents having the essential capacity of forming solid solutions with the phenolic resin, combined with a water-repellant character and a low vapor pressure in the mixture. The proportion of such diluent may be rather widely varied. Other suitable phenols may be employed instead of the ordinary phenol or cresol.

A typical molding mixture may comprise by weight, 50 parts of a resin prepared as above, 100 parts of ground mica, and three parts of carnauba wax. The mixture is ground in a ball-mill until thoroughly mixed, then worked on hot sheeting rolls to the desired plasticity.

The power factor of discs molded from the above composition was found to be 0.81% at audio-frequency (1000 cycles) and 0.37% at radio-frequency (1,000,000 cycles).

Another composition prepared from the same components in the proportion of 100 parts each of resin and mica and 4 parts of carnauba wax had when molded a power factor of 1.06% at audio- and 0.43% at raido-frequency.

A composition similar to the above except that the rosin was substituted by dammar, showed in the molded article a power factor at audio-frequency of 1.52% and at radio-frequency of 0.73%. With substitution of shellac for rosin the power factor at audio-frequency was 1.75% and at radio-frequency 0.92%. With similar substitution of manila gum the power factor was 4.15 at audio-frequency and 1.52 at radio-frequency. With substitution of di-butyl phthalate for the rosin the power factor was 3.97 at audio-frequency and 1.21 at radio-frequency.

The principles of the invention are likewise applicable for the preparation of varnishes for impregnation and like purposes, as in the manufacture of laminated sheets and other products. In such case the mixture of phenolic resin and retardant is prepared as already described, but is dissolved before the baking step in alcohol, acetone or other suitable varnish solvent. The retarding effect of the rosin or equivalent is of value in such cases in that it restrains the hardening reaction during the expulsion of the solvent from the varnish film or residue.

Instead of hexamethylenetetramine, mixtures of formaldehyde and ammonia may of course be used, and are to be regarded as equivalent thereto. In such cases the methylene groups should be present in approximately double the molecular proportion to the phenol (this being the proportion in hexamethylenetetramine triphenol) and the ammonia in sufficient proportion to impart its characteristic properties. Such mixtures yield upon heating resins of the characteristic hexamethylenetetramine - triphenol type, as that term is used herein.

I claim:

1. The hereindescribed molding mixture comprising a resin of the hexamethylenetetramine-triphenol type, a water-repellant organic substance of low vapor pressure, and a filling material.

2. The hereindescribed molding mixture comprising a resin of the hexamethylenetetramine-triphenol type, rosin, and mica.

3. A molded article comprising a hardened resin of the hexamethylenetetramine-triphenol type, water-repellant organic substance of low vapor pressure having a high insulating value, and an inorganic filler, said article having a power factor not in excess of 0.6 per cent measured at 1,000,000 cycles.

4. A potentially reactive resin of the hexamethylenetetramine-triphenol type and rosin.

5. A potentially reactive resin of the hexamethylenetetramine-triphenol type, rosin, and another water repellant organic retardant having a high insulating value and low vapor pressure.

6. A molding composition comprising a resin of the hexamethylene-triphenol type, a water-repellant organic substance of low vapor pressure and a filling material consisting of a comminuted hardened resinoid.

FRAZIER GROFF.